Patented Aug. 14, 1951

2,564,648

UNITED STATES PATENT OFFICE 2,564,648

HYDANTOIN MANUFACTURE

Arthur O. Rogers, Lewiston, N. Y., assignor to E. I. du Pont de Nemours & Company, Wilmington, Del., a corporation of Delaware No Drawing. Application March 11, 1947,
Serial No. 733,995

12 Claims. (Cl. 260—309.5)

This invention relates to certain new hydantoins and to a novel process for the production thereof. The new compounds with which this invention is particularly concerned are 5-(delta-chlorobutyl) hydantoin and 5-(delta-bromobutyl) hydantoin.

It is one of the objects of this invention to provide a new and useful process for the production of 5-(delta-chlorobutyl) hydantoin and 5-(delta-bromobutyl) hydantoin. Another object is to provide the new compounds 5-(delta-chlorobutyl) hydantoin and 5-(delta-bromobutyl) hydantoin. It is a further object of the invention to provide an efficient and practical process for the production of the aforesaid compounds in high yields. These and other objects will be apparent from the following description of the invention.

The above objects are obtained in accordance with my invention which comprises reacting 5-(delta-hydroxybutyl) hydantoin with hydrogen chloride or hydrogen bromide. Preferably 5-(delta-hydroxybutyl) hydantoin is contacted with hydrogen chloride or hydrogen bromide at elevated temperatures.

In general I may proceed by passing hydrogen chloride into contact with 5-(delta-hydroxybutyl) hydantoin heated to a temperature sufficiently high to provide a liquid reaction medium. Small amounts of water or other suitable material may be added to the hydroxy hydantoin to lower the melting point. The reaction mixture is preferably well agitated and is heated in contact with hydrogen chloride until the melting point of a sample of the product reaches the correct value or does not rise with continued treatment. The reaction usually requires about 1 to 10 hours depending upon the reaction conditions.

In one embodiment of the invention, hydrogen chloride is passed into contact with 5-(delta-hydroxybutyl) hydantoin in the presence of water. The amount of water utilized should not be more than about 50% by weight of the reaction mixture since in the presence of greater amounts of water undesirable hydrolysis of the product may occur. In general I utilize sufficient water to lower the melting point of the reaction mixture to the desired temperature of operation or slightly lower. Usually about 10 to 20% water is sufficient.

In a preferred method of carrying out the invention, I utilize a reaction medium comprising a mixture of 5-(delta-hydroxybutyl) hydantoin and 5-(delta-chlorobutyl) hydantoin as I have found that the best yields are obtained in this manner and isolation of the product is simplified. The concentration of chlorobutyl hydantoin present is not critical and will vary as the reaction proceeds. Preferably sufficient 5-(delta-chlorobutyl) hydantoin is utilized so that the reaction mixture is liquid at the preferred operating temperatures. I have found it satisfactory to use equal weights of chlorobutyl hydantoin and hydroxybutyl hydantoin.

I prefer to operate the process of my invention at elevated temperatures and I have found that temperatures of 75° to 200° C. are suitable. Preferably, I utilize temperatures within the range 115° to 135° C. for best results. At temperatures below 75° C. the reaction is slow while at temperatures above 200° C. decomposition may occur with resultant contamination of the product.

My novel process may be operated at atmospheric pressures with excellent results. However, if it is desired further to accelerate the reaction pressures greater than atmospheric may be utilized. Pressures of less than atmospheric may also be utilized if desired.

Although it is preferred to utilize gaseous hydrogen chloride or hydrogen bromide, these gases may be replaced in part by aqueous solutions as long as the total amount of water present in the reaction mixture does not exceed 50% by weight.

If desired, catalysts may be used in the operation of my invention. Examples of suitable catalysts are catalysts of the amine salt type and quaternary ammonium compounds as illustrated by pyridine, quinoline, tetramethyl ammonium chloride and trimethyl benzyl ammonium chloride.

The amine salts which are suitable are those compounds having the following general formula:

wherein each R substituent is hydrogen or an alkyl or aralkyl radical, Y is an alkyl radical and X is either chlorine or bromine. The preferred catalysts of this type are those amine salts which are aliphatic compounds in which at least two of the R substituents in the above general formula are alkyl radicals. That is, the preferred catalysts of this class are the aliphatic tertiary amine hydrochlorides and amine hydrobromides and the tetraalkyl quaternary ammonium chlorides and bromides.

Specific examples of amine salts having the above general formula and which are suitable for use in the present invention are the hydrochlorides and hydrobromides of the following amines: mono-, di- and tri-alkyl amines having from 1 to 6 carbon atoms, including mixed secondary and tertiary amines such as methylethylamine, methyldiethylamine, methylamylamine and methyldiamylamine. Amines having alkyl groups of higher carbon content such as decyl and dodecyl groups may also be used, but those amines in which the alkyl groups contain less than 7 carbon atoms will generally find most use because they are more readily available. Branched chain amines may also be used. Other examples of suitable amine hydrohalides are those in which the R substituents in the above formula include at least one alkyl radical in addition to one or two aralkyl radicals such as the hydrochloride of dimethylbenzylamine. Examples of suitable quaternary ammonium salts are tetramethyl ammonium chloride, tetraethyl ammonium chloride and trimethylbenzyl ammonium chloride and the like, especially those in which the alkyl radicals contain not more than 6 carbon atoms, and the corresponding bromides. The preferred tertiary amine hydrohalides and tetraalkyl ammonium halides are illustrated by triamylamine hydrochloride, tetramethyl ammonium chloride, tetraethyl ammonium chloride, and the corresponding bromides.

Heterocyclic amine hydrochlorides whose molecular structure includes a pyridine nucleus may also be utilized. Pyridine hydrochloride itself is highly effective as a catalyst for the above reaction and excellent results may be attained by its use. Other compounds which are suitable are the hydrochlorides of quinoline and isoquinoline and the various alkyl derivatives of such compounds, for example, 2-methylpyridine (alpha picoline), 3-methylpyridine (beta picoline), 2,5-methylethylpyridine (aldehydine), 2-propylpyridine (conyrine), 2-ethyl-3,5-dimethylpyridine (alpha parvoline) 2-methylquinoline (quinaldine) and 4-methylquinoline (lepidine). When using catalysts of this type, I prefer to utilize pyridine in the form of its hydrochloride as I have found that excellent results are obtained when using this catalyst which is readily available.

In addition to the salts of heterocyclic bases described in the foregoing paragraph, the corresponding quaternary salts may be employed, for example, alkyl pyridinium chlorides, etc. Heterocyclic bases not containing the pyridine nucleus may also be used, for example, piperidine and other hydrogenation products of the pyridine derivatives noted above, morpholine, N-alkyl morpholines, pyrrole, indole, pyrrolidine, acridine, carbazole and hydrogenation or alkylation products of such compounds.

In general, any aliphatic, alicyclic or heterocyclic secondary or tertiary amine or quaternary ammonium salt may be used.

The use of catalysts permits effective operation at lower temperatures. I have found, for example, that the best results are obtained using pyridine as catalyst at temperatures of about 90° to 100° C. instead of the preferred temperatures of 115° to 135° C. when operating the non-catalytic process. The reaction is also more rapid when a catalyst is used. In general, I prefer to utilize an amount of catalyst which is about equal to the weight of the 5-(delta-hydroxybutyl) hydantoin. Smaller quantities may be used but for effective results at least 10% by weight based on the amount of 5-(delta-hydroxybutyl) hydantoin should be present. Amounts of catalysts greater than an equal weight may be utilized but without any apparent advantage. When utilizing catalysts of the types described above, it is desirable to have present sufficient water to maintain the hydrochlorides in solution. A slight excess of water may be present but it is necessary for best results to avoid a concentration of water greater than 50% by weight of the reaction medium.

Although I have found that the utilization of catalysts in the operation of my invention is effective in increasing the reaction rate and decreasing the temperature required, I prefer to utilize a non-catalytic process utilizing a mixture of 5-(delta-hydroxybutyl) hydantoin and 5-(delta-chlorobutyl) hydantoin as the reaction medium since excellent results are thus obtained and the problem of separating and recovering a catalyst is avoided.

It is to be understood that although in the foregoing description I have referred to the preparation of 5-(delta-chlorobutyl) hydantoin, 5-(delta-bromobutyl) hydantoin is also included within the scope of this invention. The 5-(delta-bromobutyl) hydantoin is prepared in the same manner as the 5-(delta-chlorobutyl) hydantoin by utilizing hydrogen bromide in the place of hydrogen chloride as described above.

5-(delta-hydroxybutyl) hydantoin which is used as the starting material in the process of my invention is a new compound which is described in my co-pending application, Serial No. 732,653 filed March 5, 1947 (P. C. 2420). In one method described therein 5-(delta-hydroxybutyl) hydantoin is prepared by reacting deltahydroxy valeraldehyde with a compound yielding cyanide ions, a compound yielding carbonate ions and a compound yielding ammonium ions. In a preferred method these compounds yielding cyanide ions, carbonate ions and ammonium ions are reacted with a product mixture obtained by hydrating dihydropyran in dilute aqueous acid medium. A specific example of the preparation of 5-(delta-hydroxybutyl) hydantoin as described in my co-pending application is as follows:

Dihydropyran (3 moles, 252 g.), water (600 cc.) and hydrochloric acid (15 cc. of 1 N) were stirred together until the dihydropyran was dissolved. The solution was cooled and the flask swept with carbon dioxide. A solution of 3 moles (153 g.) of sodium cyanide in 360 cc. water was added slowly with stirring under carbon dioxide. Ammonium hydroxide (3.3 moles, 220 cc.) was added rapidly and stirring under carbon dioxide continued at 50–60° C. for 5 hours and at 40–45° C. over night. The mixture was cooled and acidified with 310 cc. concentrated hydrochloric acid. Two hundred and seventy grams of pure 5-(delta-hydroxybutyl) hydantoin crystallized directly. A second crop containing 26.2 g. of the hydantoin mixed with sodium chloride was obtained by evaporating the mother liquor. The total yield was 57.2% of theoretical.

The following examples illustrate my invention:

*Example 1*

5-(delta-hydroxybutyl) hydantoin (0.125 mole, 23.8 g.) was placed in a test tube and heated in an oil bath until melted. Hydrogen chloride gas was fed in for 5 hours, holding the temperature at approximately 160–175° C. The product was poured into 100 cc. of water, dissolved by heating and cooled to crystallize. After drying, the resulting crystals of 5-(delta-chlorobutyl) hydantoin weight 19.7 g. (82.5% of theoretical yield) and melted at 122–123° C.

Example 2

A mixture of 1 mole (172 g.) 5-(delta-hydroxybutyl) hydantoin and 25 cc. water was heated at approximately 115–120° C. while stirring and feeding hydrogen chloride gas for 6½ hours. The product was poured into hot water and cooled to crystallize; 159 g. (83.4% of the theoretical yield of 5-(delta-chlorobutyl) hydantoin, melting at 123–124° C. was obtained.

Example 3

A mixture of 5-(delta-hydroxybutyl) hydantoin (2 moles; 344 g.) and 5-(delta-chlorobutyl) hydantoin (344 g.) was heated to fusion by means of an oil bath, and hydrogen chloride was fed with stirring at 130–140° C. for 6.8 hours. Samples were removed periodically for melting point determination to follow the course of the reaction. These gave the following results:

| Time (hours) | M. P. of mixture (°C.) |
|---|---|
| 1.3 | 100–105 |
| 2.0 | 115–118 |
| 2.6 | 118–121 |
| 3.5 | 121–123 |
| 5.5 | 125–127 |
| 6.4 | 125–127 |
| 6.8 | 125–127 |

As indicated by the above results, the reaction was complete in 5½ hours; the yield was substantially quantitative.

In a similar experiment with smaller quantities and better gas-liquid contact, a quantitative yield of 5-(delta-chlorobutyl) hydantoin melting at 127–129° C. was obtained in 1 hour reaction time.

Example 4

Pyridine (50 g.) was saturated with hydrogen chloride gas and mixed with 0.5 mole (86 g.) of 5-(delta-hydroxybutyl) hydantoin. The mixture was heated in an oil bath and hydrogen chloride fed with stirring for 2 hours at approximately 125–130° C. The product was crystallized from 200 cc. water, to yield 90.3 g. (94.8% of theoretical) of 5-(delta-chlorobutyl) hydantoin, melting at 127–128° C.

Example 5

5-(delta hydroxybutyl) hydantoin (0.5 mole, 86 g.) and water (40 cc.) were heated to fusion in a water bath and gaseous hydrogen bromide passed in with stirring until it was no longer absorbed at an appreciable rate (2.4 hours). The product was poured into hot water and cooled to crystallize. The dried crystals weighed 104 g. (88.8% of theory) and melted at 128–129.5° C.; the melting point was unchanged by recrystallization from methanol.

Analyses of the products showed the chlorine and bromine contents to be in close agreement with the theoretical values. A recrystallized sample of 5-(delta-chlorobutyl) hydantoin was found to contain 18.47% chlorine. The calculated value for the compound is 18.60% chlorine. A sample of the 5-(delta-bromobutyl) hydantoin analyzed 33.8% bromine whereas the calculated value is 34.1%.

Both the bromo and the chloro compounds are soluble in hot water, methanol or ethanol and are sparingly soluble in these solvents cold. They are insoluble in most organic solvents, for example, ethers, ketones, hydrocarbons and halogenated hydrocarbons. The compounds dissolve in aqueous alkalies and may be reprecipitated by acidification. The alkali metal salts of 5-(delta-chlorobutyl) hydantoin and 5-(delta-bromobutyl) hydantoin when heated alone or in solvents polymerize with the elimination of the alkali metal halide. Upon hydrolysis, the polymer thus obtained is converted to lysine.

The identity of these new halobutyl hydantoins was further confirmed by conversion of 5-(delta-chlorobutyl) hydantoin to 5-(delta-aminobutyl) hydantoin by treatment with ammonia. The aminobutyl hydantoin was isolated as the hydrochloride which contained the calculated quantity of ionizable chlorine. The aminobutyl hydantoin was hydrolyzed to yield lysine which was isolated as the dihydrochloride and the monohydrochloride. Each of these compounds had the correct melting point and ionizable chlorine content.

The new compounds 5-(delta-chlorobutyl) hydantoin and 5-(delta-bromobutyl) hydantoin are useful as chemical intermediates for the preparation of other useful organic compounds. They are of particular utility in that they may be utilized for the synthesis of lysine, a material which is potentially of major commercial importance as a component as feed for live stock and which has not heretofore been available synthetically in commercial quantities.

I claim:

1. Process for the production of a 5-(delta-halobutyl) hydantoin which comprises reacting, as the sole reactants, 5-(delta-hydroxybutyl) hydantoin with a material from the group consisting of hydrogen chloride and hydrogen bromide at a temperature between 75° C. and 200° C.

2. Process for the production of 5-(delta-chlorobutyl) hydantoin which comprises reacting, as the sole reactants, 5-(delta-hydroxybutyl) hydantoin with hydrogen chloride at a temperature between 75° C. and 200° C.

3. Process for the production of 5-(delta-bromobutyl) hydantoin which comprises reacting, as the sole reactants, 5-(delta-hydroxybutyl) hydantoin with hydrogen bromide at a temperature between 75° C. and 200° C.

4. The process of claim 1 wherein the temperature is 115° to 135° C.

5. The process of claim 1 wherein the reaction is carried out in the presence of not more than 50% by weight of water based on the weight of the reaction mixture.

6. The process as defined in claim 1 wherein the reaction is carried out in the presence of a catalyst taken from the group consisting of amine salts and quaternary ammonium compounds.

7. The process of claim 5 wherein the reaction is carried out in the presence of a catalyst.

8. The process as defined in claim 5 wherein the reaction is carried out in the presence of a catalyst taken from the group consisting of amine salts and quaternary ammonium compounds.

9. Process for the production of a 5-(delta-halobutyl) hydantoin which comprises reacting 5-(delta-hydroxybutyl) hydantoin with a material from the group consisting of hydrogen chloride and hydrogen bromide at a temperature between 75° C. and 200° C. in the presence of not more than 50% by weight of water based on the weight of the reaction mixture and in the presence of pyridine as a catalyst.

10. In a process for the production of a 5-(delta-halobutyl) hydantoin, the step which comprises reacting, as the sole reactants, 5-(delta-hydroxybutyl) hydantoin with a material from the group consisting of hydrogen chloride and hydrogen bromide in the presence of a mixture of 5-(delta-hydroxybutyl) hydantoin and a compound taken from the group consisting of 5-(delta-chlorobutyl) hydantoin and 5-(delta-bromobutyl) hydantoin at a temperature between 75° C. and 200° C.

11. The process as defined in claim 10 wherein the reaction is carried out in the presence of a catalyst taken from the group consisting of amine salts and quaternary ammonium compounds.

12. The process of claim 10 wherein the temperature is 115° to 135° C.

ARTHUR O. ROGERS.

REFERENCES CITED

The following references are of record in the file of this patent:

Chem. Abst., vol. 27, p. 1924 citing Hoppe-Seyler-Z. Physiol. Chem. 214, pp. 267–270 (1933).

Comptes Rendus, vol. 197, pp. 1652–1654 (1933).

Henze et al., Jour. of Organic Chemistry (January 1943), pp. 17–28.

Livak et al., Journal American Chemical Society, vol. 67 (1945), p. 2219.